(12) United States Patent
Ohyama et al.

(10) Patent No.: US 7,152,016 B2
(45) Date of Patent: Dec. 19, 2006

(54) USABILITY EVALUATION SUPPORT APPARATUS AND METHOD

(75) Inventors: Tsutomu Ohyama, Ashigarakami-gun (JP); Toru Tanaka, Ashigarakami-gun (JP); Yoshitsugu Hirose, Ashigarakami-gun (JP); Toshie Mihira, Ashigarakami-gun (JP); Kazuo Shibuta, Ashigarakami-gun (JP); Katsura Sakai, Ashigarakami-gun (JP); Hideto Yuzawa, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 727 days.

(21) Appl. No.: 10/360,917

(22) Filed: Feb. 10, 2003

(65) Prior Publication Data

US 2004/0075685 A1  Apr. 22, 2004

(30) Foreign Application Priority Data

Sep. 19, 2002  (JP) ............................. 2002-273720

(51) Int. Cl.
*G06F 11/30*  (2006.01)
(52) U.S. Cl. ...................................... 702/182; 717/131
(58) Field of Classification Search ................ 702/182, 702/183
See application file for complete search history.

(56) References Cited

U.S. PATENT DOCUMENTS

| 5,041,972 A | 8/1991 | Frost .......................... 705/10 |
| 5,084,819 A | 1/1992 | Dewey et al. ............... 434/262 |
| 5,086,393 A | 2/1992 | Kerr et al. ................... 702/182 |
| 5,496,175 A | 3/1996 | Oyama et al. ............... 434/118 |
| 5,651,112 A | 7/1997 | Matsuno et al. .............. 714/47 |
| 5,724,262 A | 3/1998 | Ghahramani ................ 702/186 |
| 5,808,908 A | 9/1998 | Ghahramani ................ 702/182 |
| 6,047,261 A | 4/2000 | Siefert ........................ 705/11 |

FOREIGN PATENT DOCUMENTS

| JP | A 7-56730 | 3/1995 |
| JP | 8-29209 | 2/1996 |
| JP | A 8-36510 | 2/1996 |
| JP | 8-77220 | 3/1996 |
| JP | A 8-153022 | 6/1996 |
| JP | A 8-161197 | 6/1996 |
| JP | A 10-124583 | 5/1998 |

(Continued)

OTHER PUBLICATIONS

Oppermann, Reinhard et al. "Software evaluation using the 9241 evaluator." Behavior and Information Technology 1997. vol. 16, No. 4/5 pp. 232-245.*

(Continued)

*Primary Examiner*—Marc S. Hoff
*Assistant Examiner*—Manuel L. Barbee
(74) *Attorney, Agent, or Firm*—Oliff & Berridge, PLC

(57) ABSTRACT

There is disclosed an apparatus for supporting evaluation of usability in consideration of situations particular to each business and ISO evaluation standards. The usability evaluation support apparatus uses an instrument including a display portion for displaying information, and supports the evaluation of usability in achieving a given task. During achievement of the task, a control unit acquires information of an operation log related to an operation performed by a user, and divides an effectiveness index associated with achievement of the task, efficiency index associated with efficiency for the achievement, and satisfaction index associated with subjective satisfaction of a task achiever for each predefined subtask. The unit evaluates the indexes by a statistical calculation using measurement results of a plurality of measurement items including the information of the operation log for each subtask.

6 Claims, 9 Drawing Sheets

FOREIGN PATENT DOCUMENTS

| JP | A 2000-293501 | 10/2000 |
|---|---|---|
| JP | A 2001-51876 | 2/2001 |
| JP | A 2001-56771 | 2/2001 |
| JP | A 2002-123452 | 4/2002 |
| JP | A 2002-149633 | 5/2002 |
| JP | A 2002-169708 | 6/2002 |
| JP | A 2002-175290 | 6/2002 |
| JP | 2002-189917 | 7/2002 |
| WO | WO 95/16949 A1 | 6/1995 |
| WO | WO 9516949 A1 * | 6/1995 |

OTHER PUBLICATIONS

Oppermann, Reinhard et al. "Software evaulation using the 9241 evaluator." *Behavior and Information Technology* 1997 vol. 16, No. 4/5 pp. 232-245.

Yamaoka, Toshiki et al. "Structured User Interface Design and Evaluation- 23 points for creating an easy-to-understand Operating screen." *Research Institute of Human Engineering . . . SIDE Demonstration Working Group*.

U.S. Appl. No. 10/360,910, filed Feb. 10, 2003, Tanaka et al.

Rosenbaum, S.; "Usability Evaluations Versus Usability Testing: When and Why?," *IEEE Transactions on Professional Communication*, vol. 32, issue 4; 1989, pp. 210-216.

Herman, L., "Towards Effective Usability Evaluation in Asia: Cross-Cultural Differences," 6th *Australia Conference on Computer-Human Interaction*, Nov. 24-27, 1996, pp. 135-136.

Matera, M., et al., "SUE Inspection: An Effective Method for Systematic Usability Evaluation of Hypermedia," *IEEE Transactions on Systems, Man and Cybernetics*, Part A; vol. 32, issue 1; Jan. 2002; pp. 93-103.

Seffah, A., et al., "Comparing and Reconciling Usability Centered and Case-Driven Requirements Engineering Processes," *Proceedings 2nd Australian User Interface Conference*, Jan. 29-Feb. 1, 2001, pp. 132-139.

Gutwin, C., et al., "The Mechanics of Collaboration: Developing Low Cost Usability Evaluation Methods for Shared Workspaces," *IEEE 9th Int'l Workshop on Enabling Technologies: Infrastructure for Collaborative Enterprises*, Jun. 14-16, 2000, pp. 98-103.

Kazumasa Ando, "Service Newly Started for Having Users Visiting the Web Site Evaluate Usability", Nikkei Internet Technology, Nov. 22, 2001, Nikkei BP, Inc. No. 53, p. 23, ISSN 1343-1676.

* cited by examiner

USABILITY EVALUATION SUPPORT APPARATUS AND METHOD

BACKGROUND OF THE INVENTION

1. Field of the Invention

The present invention relates to an apparatus for supporting evaluation of usability related to an operation with respect to a device or instrument which receives a user input and presents at least visual information in accordance with a content of the operation. An example of such an instrument would be a device that includes a graphical user interface (GUI).

2. Description of the Related Art

Instruments which present visual information related to user operation in order to supply various information, such as an instrument state and predetermined calculation result, to a user have become common and widespread. Examples of such instruments commonly found in most offices include copying machines, computers, and air conditioners. For example, most modern copying machines include a panel for setting the number of copies to be made and various copying functions (double-sided copying and reduction/enlargement), and a user operates the instrument based on the supplied visual information. Here, the visual information presented is not limited to dynamic information displayed on a liquid crystal display (LCD) such as information indicating the number of copies requested, but includes printed and fixed information, such as, for example, numerals "1", "2", . . . printed on a ten key keypad disposed for setting the number of copies to be made in the copying machine.

As instrument functionality has grown more sophisticated, operations have increasingly become complicated. International efforts have been made to facilitate improvement of instruments by providing indexes for evaluating the usability of instruments, such as user-friendliness of using the instrument, effectiveness of use of the instrument, efficiency, and satisfaction given to a user of the instrument. For example, the ISO 9241-11 standard (Ergonomic requirements for office work with visual display terminals (VDTs)-Part 11: Guidance on usability) defines evaluation measures related to usability from the viewpoints of effectiveness, efficiency, and satisfaction, and device usability can be enhanced through such evaluation.

Here, usability indicates the degree of effectiveness, efficiency, and user satisfaction in achieving a designated object under designated circumstances of a certain product by a designated user. The effectiveness indicates accuracy and completeness in achieving a designated result, efficiency measures the amount of resources consumed in association with the accuracy and completeness in achieving the target by the user, and satisfaction measures comfort and acceptability for a user who uses a computer system and the computer system, that is, the degree to which a user is free from frustration and is able to maintain a positive attitude toward product use.

Known methods of performing evaluation of a task using information from users who have completed the relevant task include questionnaires in which users independently read and answer questions and interviews where users are asked questions and provide answers to evaluators. With a questionnaire, although a specific event at a task achieving time or an entire impression at a task end time can be better understand, a relationship between the operation content and problem is often unclear, and it is often difficult to use the information to improve the device.

There are known apparatuses for recording a user operation log and diagrammatically displaying the log record to facilitate analysis (e.g., Patent Document 1:Japanese Patent Application Laid-Open No. 8-153022). Moreover, there are techniques for recording and reproducing the operation log between the system which is an evaluation object, and the user and listing and displaying the state log of the system (e.g., Patent Document 2:Japanese Patent Application Laid-Open No. 2001-51876).

Furthermore, there is another related art system in which user testing is employed. In user testing, a test subject regarded as a user actually operates the instrument, a test subject which attempting to perform a task is observed by an observer, the observer presumes what the test subject is going to do, and the observer notes steps at which the usability drops.

For example, when it is observed that the test subject's eyeshot moves over an operation panel, it is presumed that the test subject is searching the panel for information or a means to input a desired command. When this takes an excessively long amount of time, it is presumed that the operation of the panel is not clear and the panel design is not efficient for operation, and therefore the usability of such a panel is low.

However, in these related-art methods of evaluating usability, an evaluator must refer to records of the operation log, state log of the system, and test subject psychological state to conduct the evaluation. As a result, the evaluator's arbitrary judgment is easily included in the evaluation and data, and judgments often depend on the evaluator's acquaintance.

When there are a plurality of evaluators, particularly when there are many evaluation objects, a unified evaluation is not easily obtained, and portions requiring improvement are not easily distinguished. Moreover, to obtain the questionnaire or interview information from the test subject, only the content that the test subject is aware of can be extracted. Therefore, there is a large possibility that a test subject will unconsciously edit their thoughts or comments in order to describe the psychological state after the end of the operation. Furthermore, in the evaluation method of the usability, the indexes of the usability in conformity with ISO9241-11 such as effectiveness, efficiency, and satisfaction are not always obtainable.

Additionally, even if data corresponding to the indexes such as effectiveness, efficiency, and satisfaction is obtained, the content or definition of the index differs with each type of business, and therefore it is further difficult to unify the evaluation. Moreover, effectiveness, efficiency, and satisfaction can be defined in each situation of use of the evaluation object. Therefore, when the effectiveness, efficiency, and satisfaction are not obtained according to the same definitions among the objects to be compared/evaluated, the meaning of quantification and evaluation is weakened. Additionally, there has been a demand that a specific component of a certain task be evaluated as a factor of deterioration of usability in order to improve that component. Therefore, evaluator's burden is heavy, and sufficient training with respect to the evaluator is necessary.

Additionally, there remains an unfulfilled demand for the ability to evaluate a task component which is adversely effecting the usability.

SUMMARY OF THE INVENTION

The present invention was developed in consideration of the above-described actual condition, and provides an apparatus for dividing an evaluation result into subtasks by factor analysis and supporting evaluation of usability so that a component adversely effecting usability can easily and efficiently be found in consideration of the circumstances of a particular business in a mode suitable for evaluation by ISO standards.

In the present invention, there is provided an apparatus which uses an instrument including a display unit for displaying information to support evaluation of usability in achieving a given task, the apparatus comprising means for acquiring at least one item of information of an operation log related to an operation performed by a user in achieving the task; and index evaluation means for evaluating and generating at least one effectiveness index, efficiency index, and satisfaction index in achieving a target of the task. The index evaluation means uses at least one data item included in at least one of a plurality of measurement items including the information of the operation log to evaluate the effectiveness, efficiency, and satisfaction indexes. The index evaluation means divides measurement results concerning the achievement of a subtask for each subtask included as a constituting element in the task, and uses the divided measurement results to evaluate the effectiveness, efficiency, and satisfaction indexes for each subtask. Moreover, here, the apparatus further comprises means for acquiring information concerning the user as a biometric data (or physiological data) at the achieving time of the task, and the index evaluation means preferably evaluates the effectiveness, efficiency, and satisfaction indexes by a statistical calculation using the measurement results of the plurality of measurement items including the information of the operation log and the biometric data. Furthermore, a content of the statistical calculation in evaluating the effectiveness, efficiency, and satisfaction indexes in the index evaluation means can preferably be changed. When the content of the statistical calculation can be changed in this manner, the evaluation is possible in accordance with circumstance of each business.

Furthermore, according to a certain aspect of the present invention, there is provided an apparatus which uses an instrument including a display unit for displaying information to support evaluation of usability in achieving a given task, the apparatus comprising means for acquiring information of an operation log related to an operation performed by a user in achieving the task; and index evaluation means for individually evaluating an effectiveness index related to achievement of the task, efficiency index related to an achieving efficiency, and satisfaction index related to subjective satisfaction of a task achiever. The index evaluation means uses measurement results of a plurality of measurement items including the information of the operation log to evaluate the effectiveness, efficiency, and satisfaction indexes; divides the measurement results concerning the achievement of a subtask for each subtask included as a constituting element in the task; and uses the divided measurement results to evaluate the effectiveness, efficiency, and satisfaction indexes for each subtask.

That is, it is considered that a given task usually includes a number of subtasks. For example, a task of reserving an air ticket using the Internet may include partial tasks (subtasks) of:

(1) preparing a connection environment (for example, opening a browser window);
(2) checking availability of a desired flight (seat availability); and
(3) performing a reserving procedure.

Because according to certain aspects of the present invention each subtask is evaluated, it is easy to determine which specific steps or factors most adversely affect overall usability.

In this aspect, the apparatus further comprises means for acquiring biometric data (information concerning the user) while of the task, and the index evaluation means preferably uses measurement results of a plurality of measurement items including the information of the operation log and the information concerning the living organism to evaluate the effectiveness, efficiency, and satisfaction indexes for each subtask. Moreover, preferably the apparatus further comprises means for acquiring satisfaction evaluation of the user concerning the achievement of the task by questionnaire, and the index evaluation means uses the measurement results of a plurality of measurement items including the information concerning a result of the questionnaire to evaluate the effectiveness, efficiency, and satisfaction indexes for each subtask.

According to a certain aspect of the present invention, there is provided an apparatus which uses an instrument including a display unit for displaying information to support evaluation of usability in achieving a given task, the apparatus comprising means for acquiring information of an operation log related to an operation performed by a user in achieving the task; and means for using measurement results of a plurality of measurement items including the information of the operation log to evaluate an effectiveness index, efficiency index, and satisfaction index in achieving a subtask for each subtask included as a constituting element in the task.

According to another aspect of the present invention, there is provided a method for using an instrument including a display unit for displaying information to support evaluation of usability in achieving a given task, the method comprising a step of acquiring information of an operation log related to an operation performed by a user in achieving the task; and an index evaluation step of individually evaluating an effectiveness index related to accuracy and completeness in achieving a target of the task, an efficiency index related to a resource consumed in association with the accuracy and completeness in achieving the target of the task, and a satisfaction index related to satisfaction of a task achiever in achieving the target of the task. The index evaluation step is a step of using measurement results of a plurality of measurement items including the information of the operation log to evaluate the effectiveness, efficiency, and satisfaction indexes. The step further comprises the steps of: dividing the measurement results concerning the achievement of a subtask for each subtask included as a constituting element in the task; and using the divided measurement results to evaluate the effectiveness, efficiency, and satisfaction indexes for each subtask.

According to further aspect of the present invention, there is provided a program for enabling a computer to use an instrument including a display unit for displaying information and to execute processing of supporting evaluation of usability in achieving a given task. The program allows the computer to execute a procedure of acquiring information of an operation log related to an operation performed by a user in achieving the task; and a procedure of using measurement results of a plurality of measurement items including the information of the operation log to individually evaluate an effectiveness index related to achievement of the task, an efficiency index related to an achieving efficiency, and a satisfaction index related to subjective satisfaction of a task achiever. The computer is further caused to execute a procedure of dividing the measurement results concerning the achievement of a subtask for each subtask included as a constituting element in the task; and using the divided measurement results to evaluate the effectiveness, efficiency, and satisfaction indexes for each subtask.

DESCRIPTION OF THE PREFERRED EMBODIMENT

Figure 1:
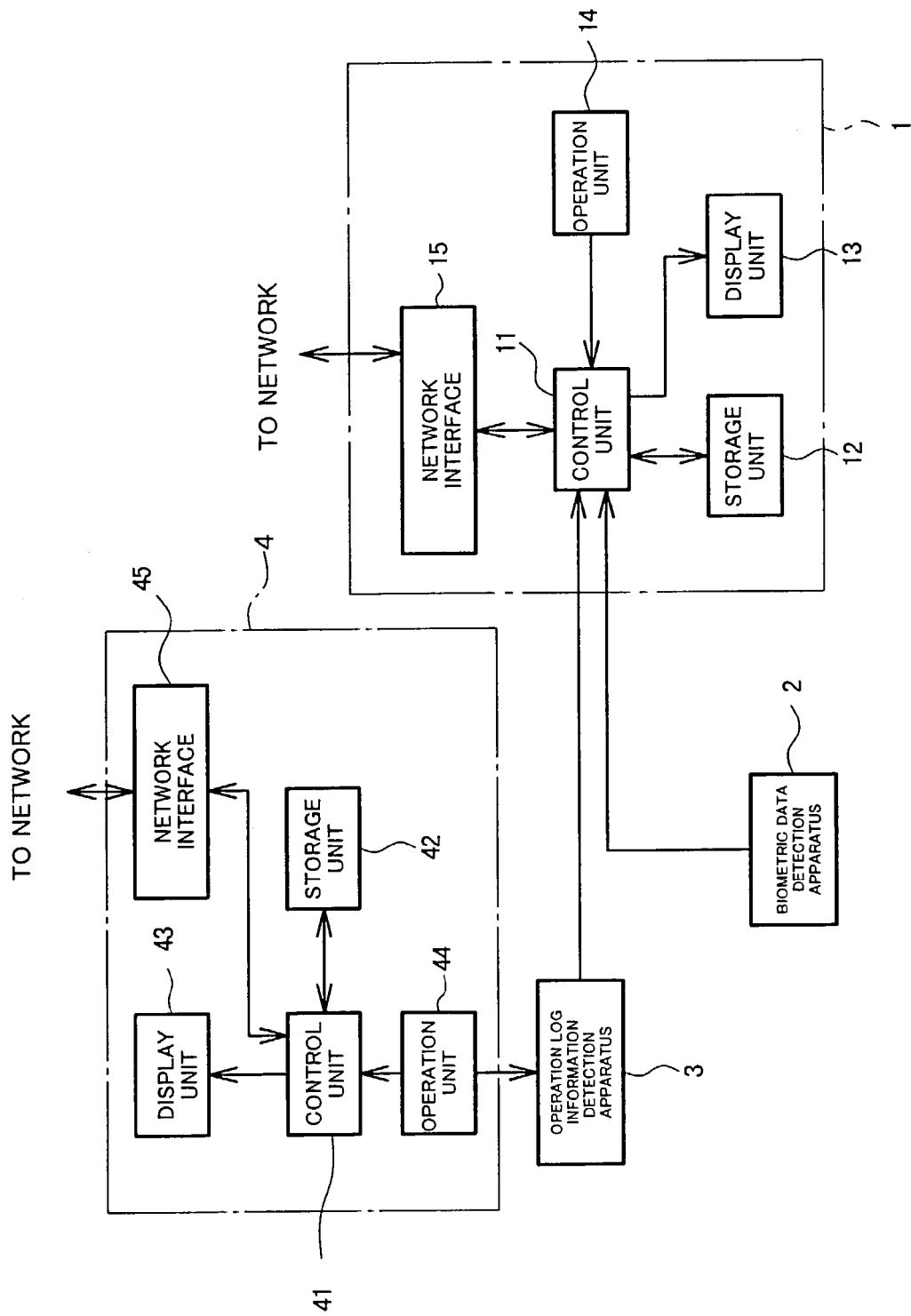
FIG. 1 is a block diagram of a usability evaluation support apparatus according to an embodiment of the present invention.

A preferred embodiment of the present invention will be described with reference to the drawings. As shown in FIG. 1, a usability evaluation support apparatus 1 is a conventional computer including a control unit 11, storage unit 12, display unit 13, operation unit 14, and network interface 15. Moreover, the usability evaluation support apparatus 1 is connected to a biometric data detection apparatus 2 for detecting biometric data related a user, operation log information detection apparatus 3, and an apparatus 4 including a display apparatus used by the user. The apparatus 4 includes a control unit 41, storage unit 42, display unit 43, operation unit 44, and network interface 45.

The control unit 11 of the usability evaluation support apparatus 1 operates in accordance with a program stored in the storage unit 12, and executes evaluation support processing of usability. This evaluation support processing of the usability will be described in detail below.

The storage unit 12 may include computer readable recording media such as a hard disk or CD-ROM, and storage devices such as a random access memory (RAM) and read only memory (ROM), and the program to be processed by the control unit 11 may be stored in the computer readable recording medium. Moreover, the storage unit 12 may also operates as a work memory of the control unit 11.

The display unit 13 including a display displays information in accordance with an instruction inputted from the control unit 11. The operation unit 14 including a keyboard and/or mouse (pointing device) outputs a content of operation of a user to the control unit 11. The network interface 15 is connected to a network, and transmits data via the network in accordance with the instruction inputted from the control unit 11. Moreover, the network interface 15 receives data coming via the network, and outputs the data to the control unit 11.

The biometric data detection apparatus 2 acquires information concerning the user, and outputs biometric data to the control unit 11. Examples of biometric data acquired here include direction and extent of user eye movements, speed of movement, fixation time, noted order, size of pupil, perspiration amount, pulse rate, heart rate, electroencephalogram patterns, and the like. In the following description, an example is described in which the biometric data detection apparatus 2 is an apparatus for detecting a users focal point, and may be, for example, a commonly known apparatus which is attached to a user's head or the vicinity of the head and which captures an image as viewed by the user to detect the direction of focus from the picked-up image.

The operation log information detection apparatus 3 is connected to the operation unit 44 of the apparatus 4, and records the content of the operation performed by the user in the operation unit 44 of the apparatus 4, which is data of an operation log. In response to the instructions, the apparatus outputs the recorded data to the usability evaluation support apparatus 1.

The control unit 41 of the apparatus 4 operates in accordance with the program stored in the storage unit 42, executing predetermined processing in accordance with the user instruction input via the operation unit 44, and displaying information to be presented to the user in a relation with the processing in the display unit 43. The storage unit 42 may comprise one more computer readable recording media such as a hard disc or a CD-ROM, or data storage structures such as RAM and ROM, and the program to be processed by the control unit 41 may be stored on a computer readable recording medium. Moreover, the storage unit 42 may also operate as a work memory of the control unit 41.

The display unit 43 including the display displays the information in accordance with the instructions input via the control unit 41. The operation unit 44 including the keyboard and/or mouse (pointing device) outputs the content of the evaluator's operation to the control unit 41. Moreover, the operation unit 44 is connected to the operation log information detection apparatus 3, and outputs the content of the operation to the operation log information detection apparatus 3. The network interface 45 is connected to the network, and transmits the data via the network in accordance with the instruction inputted via the control unit 41. Moreover, the network interface 45 receives data coming via the network, and outputs the data to the control unit 41.

The apparatus 4 is a terminal of a dialog type (responds to the user operation and displays the information with respect to the user) for use in executing a given task by the user. That is, the user executes a task of operating the operation unit 44, such as, for example, using a web site on the network to perform online shopping, or using table calculation application to create and display the graph on the display unit 43.

[Evaluation Support Processing of Usability]

Figure 2:
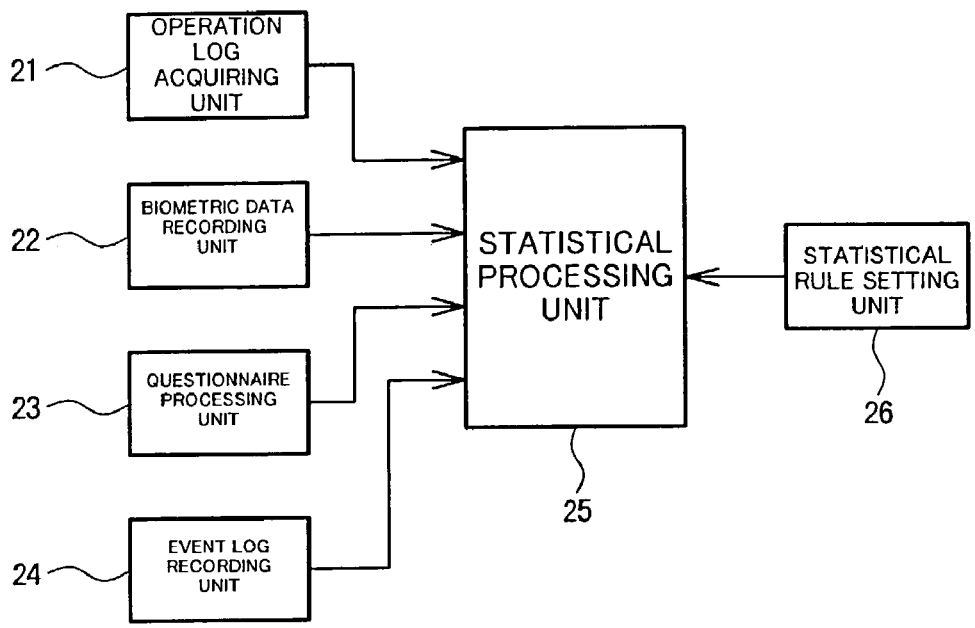
FIG. 2 is a function block diagram showing a usability evaluation support program.

Here, the evaluation support processing of the usability of the control unit 11 will be described. In the present embodiment, the evaluation of usability is performed using a record of the user's operations, a record of the user's biometric data, and information from questionnaire completed by the user. More specifically, as shown in FIG. 2, a program for the evaluation processing of the usability stored in the storage unit 12 includes an operation log acquiring unit 21, biometric data recording unit 22, questionnaire processing unit 23, event recording unit 24, statistical processing unit 25, and statistical rule setting unit 26.

The operation log acquiring unit 21 acquires data of the operation log recorded in the operation log information detection apparatus 3 and successively stores the data in the storage unit 12 in association with the operation in the operation unit 44. Examples of the data include coordinate information of a moved position of a pointer (e.g., arrow) displayed on the display unit 43 in cooperation with the mouse, the number of clicks, the number of typing operations of the keyboard, and the like. All the data of the operation log will here be referred to as "operation log information".

The biometric data recording unit 22 successively stores in the storage unit 12 data indicating positions on the display unit 43 watched by the user during the achievement of the task (user focal point) based on data input via the biometric data detection apparatus 2. Here, the stored data of the position of the focal point (the point of focus) is recorded, for example, as coordinate information on the display unit 43.

Figure 3:
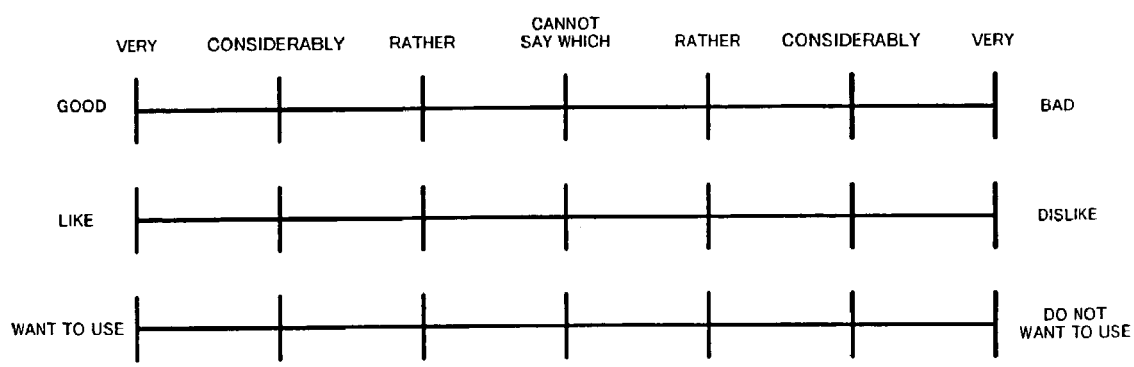
FIG. 3 is an explanatory view showing one example of a questionnaire.

For example, as shown in FIG. 3, the questionnaire processing unit 23 allows the user to rate features such as a cognitive tendency of attitude "good-bad", behavior tendency "want to use-do not want to use", and emotional tendency "like-dislike". The unit receives an input of rating result via the operation unit 14, and stores the rating result which is satisfaction data in the storage unit 12. Moreover, the questionnaire processing unit 23 preferably checks a change of a pupil diameter with time from the biometric data detection apparatus 2, and stores the size of the pupil diameter which is a ratio to the pupil diameter at a standard time (diameter in referring to the brightness nearly equal to that of the environment in which the task is achieved) as the satisfaction data in the storage unit 12. In general, a human pupils tend to have a larger relative diameter when a person is pleasant, while a smaller relative diameter tends to be associated with unpleasant or negative feelings. Therefore, how the user feels when performing a task can be measured by comparison of the results. In this manner, user satisfaction can be estimated using not only questionnaires and interviews, but also actual biometric data obtained from a user while performing the task. Satisfaction information including at least one satisfaction data is statistically processed later, and used in calculating an index of user satisfaction. Specifically, evaluation of scales such as "like-dislike" is processed using a so-called semantic differential (SD) method.

The event recording unit 24 stores in the storage unit 12 uniform resource locator (URL) information indicating processing performed by the control unit 11 in association with the user's achieving of a task such as display of help information to the display unit 13 or display of a webpage, information indicating that a screen has moved, information acquired with error occurrence, and event information (the number of displays or occurrences or time required in the processing) indicating whether or not the user has achieved the task (or a part of the task).

It is to be noted that information indicating whether or not the user has achieved the task (or a part of the task) as described above, event information set beforehand as a condition can be obtained and it can then be judged that the task has been "achieved". For example, when the content of the task indicates online shopping using a website, and to the time of access of a URL for a screen for completing online shopping is accessed is used as the completion time for the online shopping, and it is judged that the task has been achieved. Similarly, input of a payment recipient during online shopping can be judged as one component of the online shopping task. Moreover, as an example of online shopping, for the task achieved while visiting back and forth among a plurality of webpages, a condition for achievement can be determined using conditions of information such a transfer destination page to be finally reached, transfer destination contents, link clicked as a transfer destination, the URL of a group of a plurality of pages to be transferred, order of URLs of a group of pages to be transferred, and input information in the middle of task achieving or final stage of page transfer. Similarly, when the information is input by a user through a keyboard, and when the input information is compared with correct information to be input, a right/wrong ratio is calculated, which may also be used as an index of effectiveness.

The statistical processing unit 25 uses at least one data item related operation log included in the operation log information stored in the storage unit 12, at least one data item included in the biometric data, at least one data item related to satisfaction included in satisfaction information, or at least one record of an event to generate at least one index of effectiveness, efficiency, and satisfaction in accordance with a statistical rule for index calculation set by the statistical rule setting unit 26. Moreover, the statistical processing unit 25 performs statistical processing with respect to the generated index in accordance with the statistical rule for evaluation result set by the statistical rule setting unit 26. The unit calculates and outputs evaluation results effectiveness, efficiency, and satisfaction corresponding to the generated index. Concretely, as shown in Table 1 below, the indexes generated by the statistical processing unit 25 are the indexes of effectiveness, efficiency, and satisfaction. For effectiveness, an index which indicates accuracy or completeness in achieving a given target by a user is generated and employed. For efficiency, an index concerning the amount of resources consumed in relation to the accuracy or completeness for the user to achieve the target is generated and employed. For satisfaction, an index concerning the user's satisfaction is generated and employed. The index is represented, for example, by a numeric value or character string.

TABLE 1

| Presented Index | Content |
| --- | --- |
| Effectiveness | Accuracy or completeness for user to achieve designated target as measured by the following: 1. number of errors occurred during task execution or by task end; 2. ratio of cases in which task operation reaches a predetermined state to all cases; 1. ratio of predetermined number of transfer steps to actual number of steps in case in which task operation reaches predetermined state; 2. number of instances in which help is required in order to achieve task |
| Efficiency | Amount of resources consumed in relation to accuracy and completeness for user to achieve target as measured by the following: 1. time required for achieving task (time required for achieving task = response display waiting time + time required for interpreting displayed information + time required for operation); 2. number of clicks of pointing device required for achieving task; 3. movement amount of pointing device required for achieving task (amount of scrolling or pointing device travel); 4. input information amount required for achieving task (number of keyboard strokes); 5. number of instances of reference to an electronic manual required for achieving task; 6. screen transfer amount required for achieving task (number of transfer pages); |

TABLE 1-continued

| Presented Index | Content |
|---|---|
| | 7. response time for screen display required for achieving task;<br>8. content amount in screen page required for achieving task (text amount/page constituting pixel amount/color number/image size and image frame number); and<br>9. biometric data (eye movement amount/perspiration amount/difference of pulse rates before and during operation/amount of blinking. |
| Satisfaction | User subjective satisfaction as measured by the following:<br>1. Satisfaction is evaluated on three scales including cognitive tendency of attitude (good/bad), behavior tendency (want to use/do not want to use), and emotional tendency (like-dislike) by SD method.<br>2. Ratio or difference between reference value and value at task execution time by biometric data ($\alpha$ wave amount by electroencephalogram/evaluation by ESAM/pupil diameter/perspiration amount) |

The statistical rule used by the statistical processing unit 25 includes a statistical rule (first rule) for index calculation, and a statistical rule (second rule) for evaluation result. The first rule indicates a degree of contribution of data included in operation log information stored in the storage unit 12, data included in biometric data, and data included in satisfaction information to the calculation of the indexes. For example, the statistical processing unit 25 uses a set of weight wi corresponding to a value Ei (i=1, 2, . . . ) of each data concerning the index of effectiveness as the first rule to calculate an index of effectiveness Veff as follows.

$$Veff = \Sigma wi \cdot Ei \quad \text{[Equation 1]}$$

The indexes of the efficiency and satisfaction are also calculated by similar processing. Each wi may also be normalized so as to obtain $\Sigma wi=1$.

Furthermore, the second rule used by the statistical processing unit 25 indicates the degree of contribution of at least one of the generated effectiveness, efficiency, and satisfaction indexes to the evaluation result for each index. For example, a set of weight vi corresponding to each index Ni (i=1, 2, . . . ) concerning the evaluation result of effectiveness is set as the second rule, and the statistical processing unit 25 calculates an evaluation result of effectiveness Seff as follows.

$$Seff = \Sigma vi \cdot Ni \quad \text{[Equation 2]}$$

Moreover, the evaluation results corresponding to the indexes of the efficiency and satisfaction are also calculated by similar processing. In such a case, each vi may also be normalized so as to obtain $\Sigma vi=1$.

The statistical rule setting unit 26 stores these statistical rules in the storage unit 12 in accordance with an instruction input from the operation unit 14. In this manner, in the present embodiment, because the statistical processing content can be changed, evaluation is possible in accordance with the circumstances of each business performed in a place with the apparatus installed therein. For example, to measure efficiency by economic efficiency, weights such as time required for the task with respect to the record (data) related to cost are more heavily weighted. To measure efficiency in terms of the load on apparatus hardware, the weight with respect to displayed information amount (text amount/page constituting pixel amount/color number) may be increased.

The program of the present embodiment includes the above-described functional components. Therefore, the usability evaluation support apparatus of the present embodiment operates as follows. When a user (test subject) achieves a given task in the apparatus 4, the data of the operation performed by the user via the operation unit 44 during the achievement of the task is stored in the operation log information detection apparatus 3.

The control unit 11 of the usability evaluation support apparatus 1 acquires this data and stores the data in the storage unit 12. Moreover, the control unit 11 successively stores in the storage unit 12 the data related to the user's biometric data detected by the biometric data detection apparatus 2 during the performing of the task. Furthermore, the control unit 11 successively stores in the storage unit 12 event information generated as the user performs the task. The data is recorded in such a manner that the time component can be seen. That is, for example, the data included in each set of operation log information, biometric data, and event information may be recorded together with their acquisition (generation) time.

Moreover, after the the task has been achieved, the control unit 11 displays on the display unit 13a diagram as shown in FIG. 3 for acquiring satisfaction information, obtains user answers, and stores input or collated answers as satisfaction data in the storage unit 12. Furthermore, the satisfaction data may also include biometric data (e.g., pupil diameter) related to the user detected by the biometric data detection apparatus 2.

The control unit 11 uses at least one data item included in the operation log information, biometric data, event information, and satisfaction information stored in the storage unit 12 to calculate the indexes of effectiveness, efficiency, and satisfaction in accordance with a preset statistical rule (first rule). The results of this processing of the statistical processing unit 25 by the statistical rule setting unit 26 are stored in the storage unit 12.

Furthermore, the control unit 11 calculates the evaluation result for each index in accordance with the statistical rule (second rule) and stores the result in the storage unit 12. The calculation and evaluation results of the respective indexes are presented on the display unit 13 in accordance with an evaluator's instruction, and used for the evaluation of usability, such as that defined by the ISO standards.

[Division of Record]

Moreover, the statistical processing unit 25 divides the recorded data included in the operation log information, biometric data, and satisfaction information stored in the storage unit 12 for each subtask included in the task. The index of the usability for each subtask (effectiveness, efficiency, and satisfaction) may also be calculated based on the divided recorded data.

Figure 4:
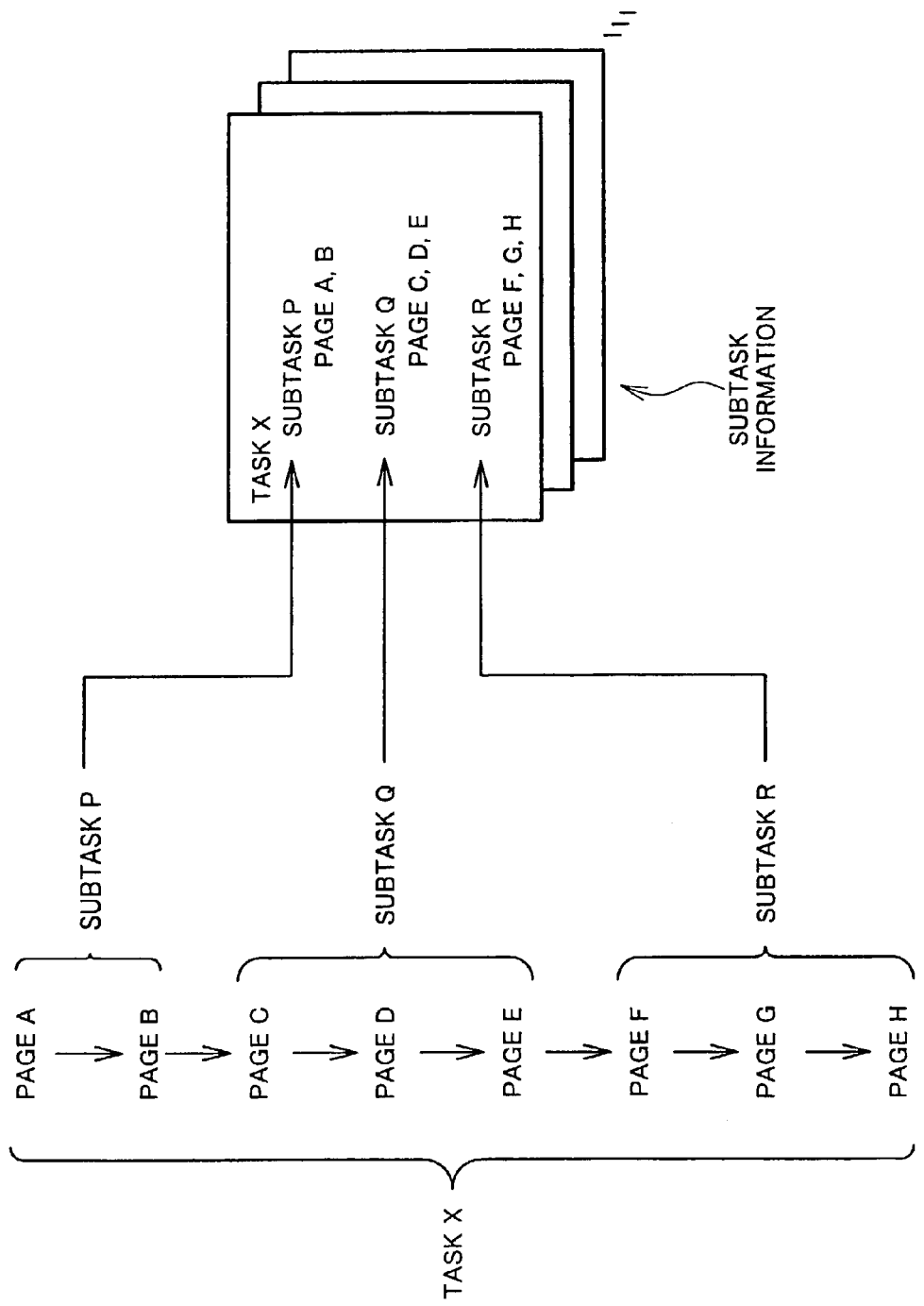
FIG. 4 is an explanatory view showing one example of definition of a subtask.

Concretely, as shown in FIG. 4, with respect to each task, information which defines divisions of subtasks is associated to form subtask information, the subtask information is stored in the storage unit 12, and the statistical processing unit 25 refers to the subtask information to divide each record.

Figure 5:
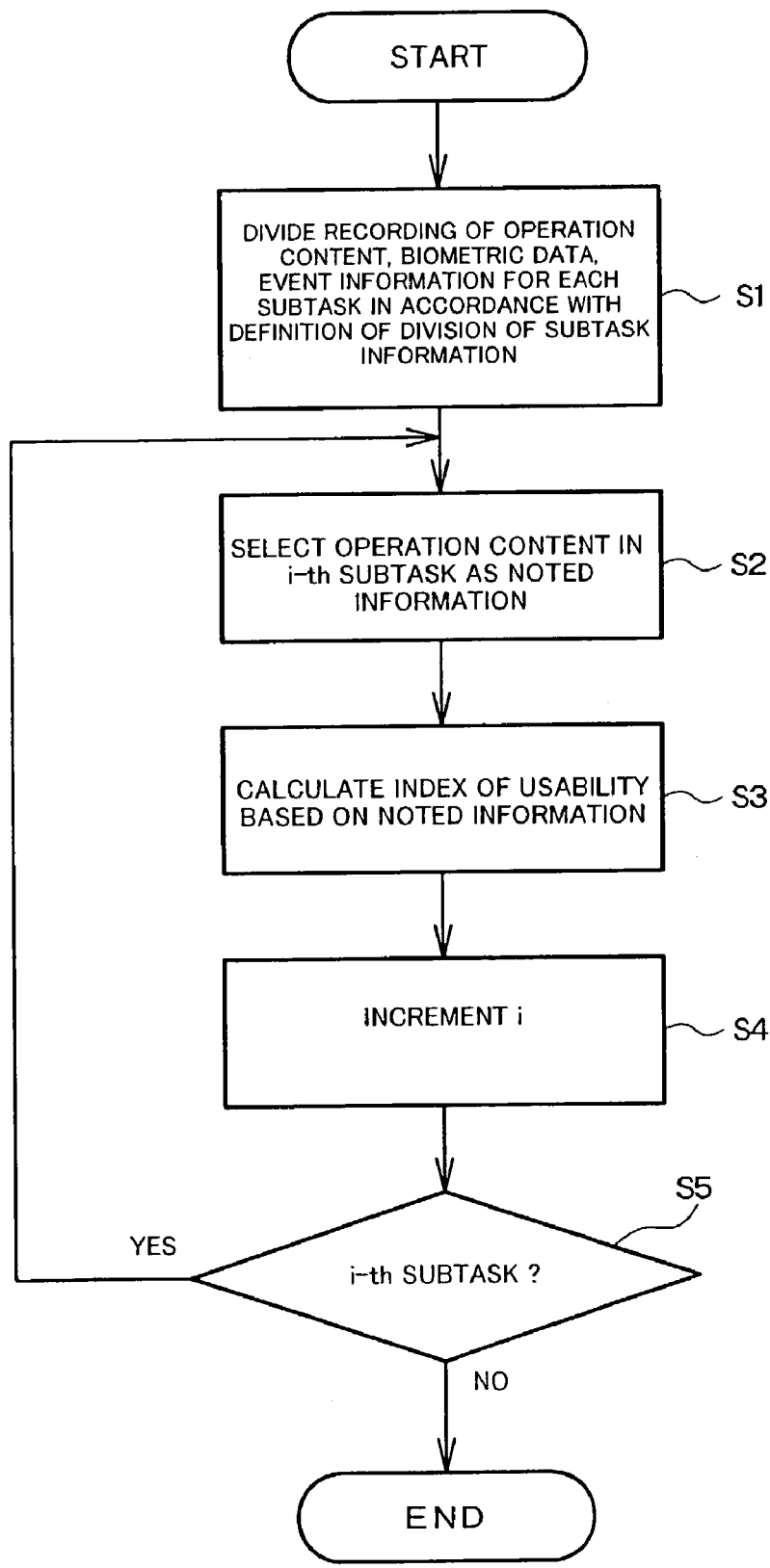
FIG. 5 is a flowchart showing processing of usability evaluation support with respect to a subtask.

Subsequently, the control unit 11 records the content of the operation, biometric data, and event information in such a form that time relation of the information can be understood. The unit executes the processing of the statistical processing unit 25 as shown in FIG. 5, refers to the subtask information stored in the storage unit 12 in association with the task being achieved by the user, and divides the record of data included in the operation content, biometric data, satisfaction information, and event information in accordance with the division definition of the subtask (S1). Subsequently, the unit selects data recorded in the i-th (first i=1) subtask which is noted data (S2), uses the noted data to similarly calculate the index of the usability (effectiveness, efficiency, and satisfaction) as described above, and stores the index in the storage unit 12 (S3). Moreover, the unit raises i to its next increment (S4) and judges whether or not there is an i-th subtask (S5). When there is such a subtask, the processing returns to step S2, and is continued, but there is no corresponding i-th subtask at step S5 (when the processing is completed with respect to all the subtasks), the processing is ended. The index of the usability for each subtask is calculated by such processing of the control unit 11.

The operation of the control unit 11 for use, for example, in the evaluation of the usability will be described using an example of performing a task while successively accessing a plurality of webpages on a website. In this example, the subtask can be defined in accordance with the URL accessed of the webpage. That is, when eight webpages A to H are accessed to achieve the task as shown in FIG. 4, a subtask P performed by accessing the webpages A, B, subtask Q performed by accessing the webpages C to E, and subtask R performed by accessing the webpages F to H are defined.

Subsequently, the control unit 11 divides the record of the operation content, biometric data, and satisfaction information at the actual achieving time of the task by the user into records. The records include a record before an opening time of the webpage C was accessed (time of change to the subtask Q from P), and a record between the time webpage C was accessed and the time of webpage F was accessed (time of change to the subtask R from Q), and a record after the time of webpage F was accessed. In this case, for accumulated measured values during the achievement of the task, the control unit 11 determines a value up to the division point. For example, when the operation time is recorded, recording time of the event information during the change of the subtask (the event information at the opening time of the webpage C in the above-described example) is used to determine and record the operation time of each subtask.

After the user achieves the task, the control unit 11 may present a questionnaire to the user, and record the obtained information as questionnaire information.

Subsequently, the record of the data of the satisfaction information including the questionnaire data, operation log information divided for each subtask, biometric data, and event information is used to calculate the index of the usability for each subtask. It is to be noted that there are also tasks which cannot be divided into subtasks. In such instances, it is assumed that the record is not divided.

[Further Use of Biometric Data]

The control unit 11 uses various biometric data to estimate the state (consistent with the level of user satisfaction) during the user's performing of the task, and may generate the corresponding evaluation. To estimate the user's psychological state using the biometric data, when the record is divided as described above and the evaluation is generated for each subtask, the psychological state of each subtask being performed may be estimated for each subtask.

Figure 6:
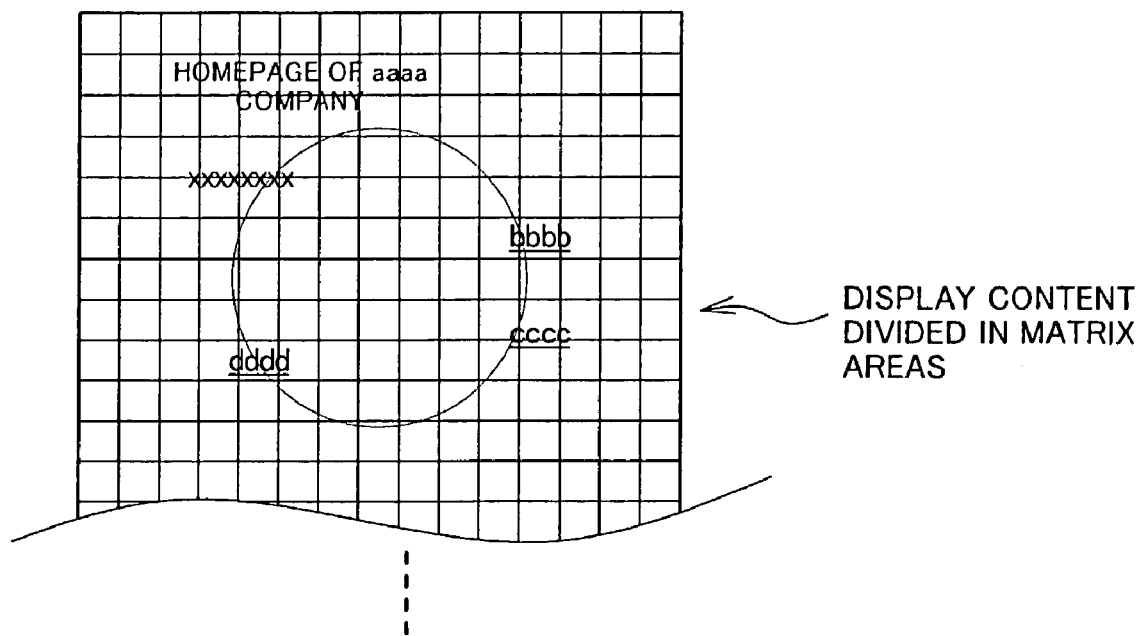
FIG. 6 is an explanatory view concerning an example of processing using focal point information as biometric data.

More specifically, the operation of the control unit 11 which uses focal point information stored as the biometric data in the storage unit 12 to estimate the user's psychological state will be described. In this case, the evaluator selects a display content (e.g., webpage) which is an object of evaluation from display contents to be displayed in the task (or the subtask) which is the object of the evaluation. Subsequently, the selected display content is sorted into an N×M (N, M being integers) matrix as shown in FIG. 6.

Subsequently, the control unit 11 measures the amount of time a user focuses on each area. Thereby, positions watched by the user for a longer time is found.

Moreover, the control unit 11 counts, for each area, the number of the number of times the user's eyes focuses on the area. Concretely, when the focal point moves into a certain area (noted area), the control unit 11 counts the number of movement of the focal point into the noted area as "1". Next, when the user moves the focal point to another area and moves the focal point into the noted area again, a counted value is incremented to "2". Thereafter, every time the user focuses on another area and again moves their focus into the noted area, the counted value is increased by one. Similarly, the control unit 11 counts the total number of areas in which the user focuses at least once. Thereby, the content displayed in the display unit 13 onto which the user's focus is most concentrated is found.

Furthermore, the control unit 11 refers to a time series change of movement of the focal point to generate information indicating the order of user's focal point movement on each area.

Figure 7:
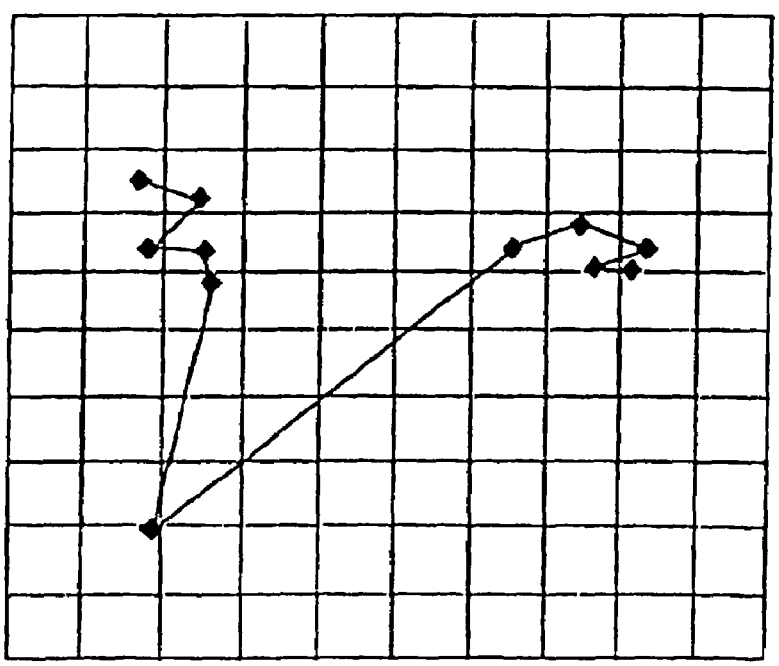
FIG. 7 is an explanatory view showing an example in which eye movement is displayed.

By the processing, the control unit 11 generates information concerning the time, frequency, and order of user viewing of each area. The evaluator may display this information together with the display content (webpage) which is the object of measurement in the display unit 13. For example, the information indicating the order of the focal point movement is displayed in the mode shown in FIG. 7. Here, any one of information concerning the time, frequency, and order is selectively displayed, and controlled not to be superposed in the display, so that viewability of a screen for evaluation purposes is improved.

The control unit 11 analyzes the information concerning the time, frequency, and order of user viewing of each area, measured and generated for each area, and judges four conditions for each area. The conditions include whether or not the user views the area longer than a predetermined time (condition concerning browsing time), whether or not the user views the area more than predetermined times (condition concerning the number of browsing operations), whether or not the focal point movement among the areas is performed in a time shorter than the predetermined time (ahead of the time) (condition concerning a browsing order), and whether the total number of areas focused on at least once is more than a predetermined threshold value (condition concerning the number of browsing areas). The unit generates information for estimating the user's psychological state and character string information concerning the evaluation based on these conditions. More specifically, the respective conditions are associated with the information of estimation/evaluation of the user's psychological state as shown in Table 2 below, and preset in the storage unit 12.

TABLE 2

| Browsing time | Number of accesses | Browsing order | Number of browsed areas | User's psychological state | Evaluation |
|---|---|---|---|---|---|
| Long | Large | Quick | Large | Cannot determine | Cannot determine because of poor expression |

TABLE 2-continued

| Browsing time | Number of accesses | Browsing order | Number of browsed areas | User's psychological state | Evaluation |
|---|---|---|---|---|---|
| Long | Large | Quick | Small | Comparing because unable to determine | Ambiguous expression |
| Long | Large | Slow | Large | At a loss | Inconspicuous |
| Long | Large | Slow | Small | Comparing | Ambiguous expression |
| Long | Small | Quick | Large | Browsing whole site | Associated items are not organized. |
| Long | Small | Quick | Small | Difficult to read | Size of character is poor |
| Long | Small | Slow | Large | Difficult to find | Arrangement, coloration are poor |
| Long | Small | Slow | Small | Items not easily read | There is problem in the area. |
| Short | Large | Quick | Large | Difficult to select | Portion to be displayed most is unclear. |
| Short | Large | Quick | Small | Comparing | Ambiguous expression |
| Short | Large | Slow | Large | Difficult to find | Too many candidates |
| Short | Large | Slow | Small | Difficult to find | Coloration is poor |
| Short | Small | Quick | Large | Cannot determine | Expression is poor and decision cannot be made |
| Short | Small | Quick | Small | Smooth operation | No problem |
| Short | Small | Slow | Large | Unexpected place | Layout is poor |
| Short | Small | Slow | Small | Unexpected place | Inconspicuous |

For example, when the browsing time is long, the number of accesses is large, the focal point movement (the browsing order) is quick, and the number of browsed areas is large, it can be judged that the user "cannot determine" the operation. The display content can be evaluated with character information indicating "representation is poor, and the operation cannot be determined".

Here, only the biometric data is used to estimate the user's psychological to evaluate content displayed in the display unit 43. However, a characteristic amount determined in accordance with a relationship between the user's operation content and focal point information may be calculated to be used to estimate the user's psychological state. For example, a vector indicating movement of the focal point, and a vector indicating movement of the pointing device as the operation content are used to calculate the size of each vector, angle θ formed between the vectors, and ratio r of the sizes of the respective vectors as the characteristic amount. The user's psychological state can be estimated as follows.

(1) When the focal point and pointer are not larger than a predetermined size (do not move much), it is presumed that one point on the display unit 43 is carefully watched, and the state of "gaze" is judged.

(2) When there is not much movement of the focal point, but the pointer is moving, it is presumed that the browsing of the contents in the webpage displayed in a browser is completed and that an operation for clicking the link to see non-displayed contents is performed, and state of "operation in the page" is determined.

(3) When the focal point moves, but the pointer does not move to a significant extent, it is presumed that a content to be seen next is searched in the display unit 43, and state of "search" is judged.

(4) When there is movement of the focal point and pointer, and θ is larger than a predetermined threshold value, directionality of the pointer operation is not aligned with that of the focal point movement. Therefore, the transfer to the next webpage is estimated (the pointer moves to click the link, whereas the focal point moves to a page head portion, and therefore the pointer and focal point generally move in directions different from each other) and state of "movement operation" is judged.

(5) When the focal point or the pointer does not move, θ is smaller than the predetermined threshold value, and the ratio r of the movement amount is large, a state in which the coordinate indicated in the position of the focal point is different from the coordinate of the pointer turns to a state in which the focal point and pointer position are concentrated to point one point. It is presumed that "return" button of the browser is to be clicked, and a state of "browser operation" is judged.

(6) When the focal point or pointer does not move, θ is smaller than the predetermined threshold value, and the ratio r of the movement amount is small, it is presumed that the pointer is moved and the position of the pointer is followed with the focal point, and "perusal" (contents which are not easily read is being read) is judged.

[Biometric Data Other than Focal Point Information]

As described above, with the use of information other than the focal point information, for example, based on electroencephalograms, it can be measured whether or not the user feels pleasant based on a ratio of a pre-measured user α wave output amount at a standard time to an α wave output amount of the user who is achieving the task. Moreover, also with the use of a sensitivity spectrum analysis method (ESAM: method of Brain Function Research Institution Co., Ltd.), judgment conditions are set with respect to analysis results to estimate the user's psychological state, and the evaluation can be obtained in accordance with the psychological state. Furthermore, as described above, the size of the pupil can be used to obtain satisfaction data. Additionally, the evaluation based on the above-described evaluation is also preferably generated as character string information.

Also when data on pupil size is used, similarly the diameter of the user's pupils under standard circumstances (direction when referring to substantially the same brightness as that of the environment for achieving the task) is compared with the diameter of the pupil of the user achieving the task. In general, the diameter of human pupils tends to be larger when that person is experiencing a pleasant feeling, and tends to be smaller when the feeling is unpleasant. Therefore, by comparing the measured diameters it can be determined whether or not the user feels pleasant while performing the task.

In this manner, the user's subjective satisfaction can be estimated using not just the questionnaire but also the biometric data obtained from the user achieving the task. Moreover, as described above, such evaluation is also preferably generated as the character string information.

[Presentation of Evaluation Support Information]

As described above, the usability evaluation support apparatus 1 according to the present embodiment calculates the indexes of the effectiveness, efficiency, and satisfaction for the usability in accordance with ISO standards. Moreover, in the present embodiment, during performance of the task which is the object of the usability evaluation, the task is divided, and the indexes of effectiveness, efficiency, and satisfaction are calculated for each subtask included in the task.

Furthermore, to calculate these indexes, "measured values" of the content of the operation performed by the user to achieve the task, biometric data concerning the user during performance of the task, answers to the questionnaire obtained from the user, and event information generated by the apparatus 4 used at the task achieving time are used.

The evaluator usually refers to the respective indexes of effectiveness, efficiency, and satisfaction, or uses the indexes to determine the evaluation result of the usability. However, in a certain case, the measured values (recorded data) directly referred to are sometimes useful for proposal of evaluation and improvement of the usability. Then, the control unit 11 performs the statistical calculation with respect to the data stored in the storage unit 12 in response to the instruction, and executes processing of displaying the statistical calculation result in the display unit 13.

More specifically, to evaluate the usability of a certain website, a plurality of users are used as test subjects, if possible. To enjoy various services provided in the website is set as each task, and the test subject actually achieves each task. Here, for example, tool "zzzz" can be downloaded frok the website of a certain company, homepage "http://www.xxxx.yyyy/" is first accessed, webpage "http://www.xxxx.yyyy/products.html" displaying a product information list is accessed from the homepage, and further webpage "http://www.xxxx.yyyy/products/downzzzz.html" for downloading the tool "zzzz" is accessed here to download the tool. An example in which there is a task using a series of webpages will be described.

The evaluator allows the plurality of test subjects to execute the task, and sets each operation in the homepage, webpage displaying the product information list, and webpage for downloading the product as the subtask. For example, the control unit 11 extracts the operation time and the number of clicks on each page from the information of the operation content among the respective measured values obtained during the task achieving for each test subject, and calculates an average (arithmetic average) with respect to these data among the test subjects for each subtask. Moreover, a standard deviation σ of each measured value is divided by a square root of a test subject M ($\sigma/\sqrt{M}$), and this value is determined to be an error.

Subsequently, the control unit 11 displays a table including the measured value of each test subject, average value, and error in the display unit 13 for each subtask (FIGS. 8(a), (c)). Moreover, an achieved situation of the task calculated from the measured value ("correct answer" for the completion of the task, if not completed "incorr ct answer"), and whole achievemente (%) may also be displayed in the table (FIG. 8(b)). Furthermore, the control unit 11 displays the situation in a graph (FIG. 9).

Figure 8:
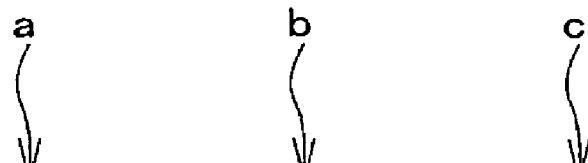
FIGS. 8–13 are explanatory views showing examples of presentation of evaluation results.
Figure 9:
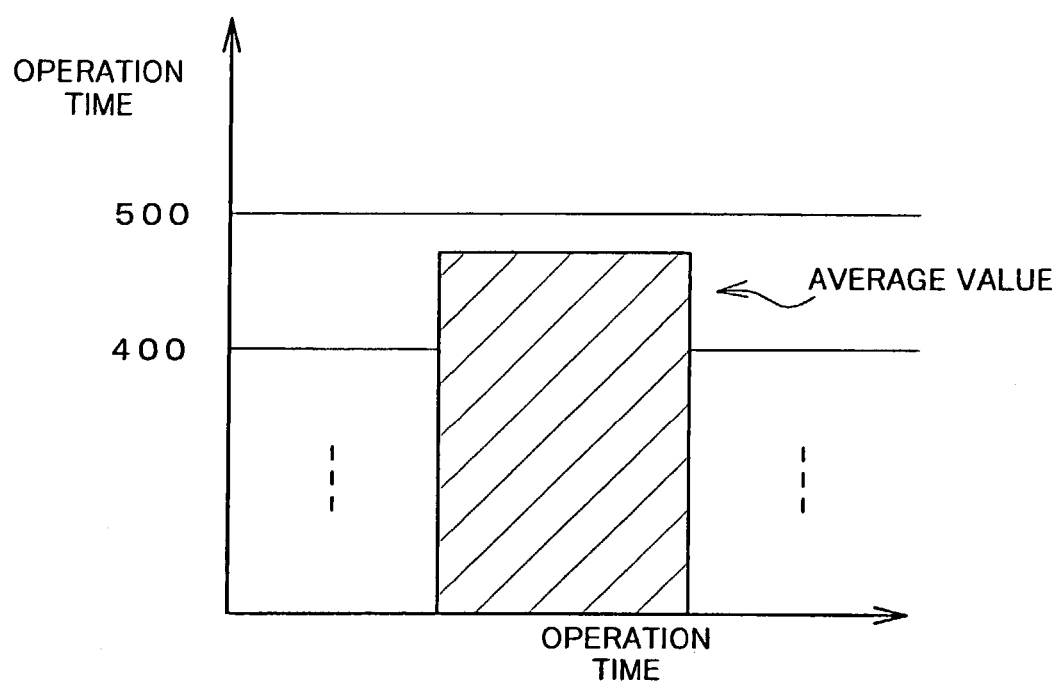
Figure 10:
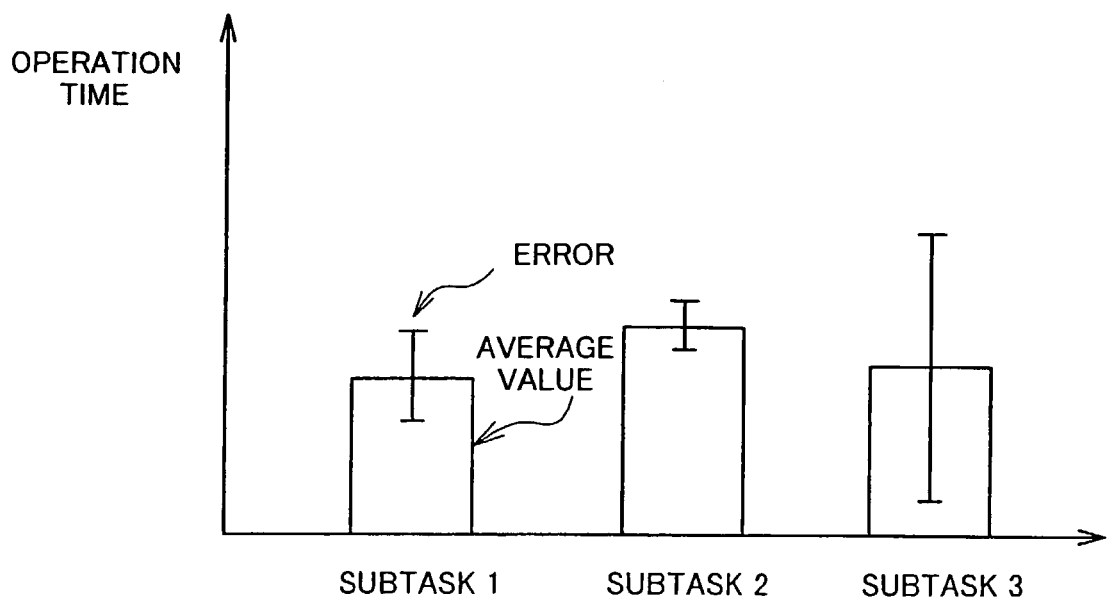

Here, for example, with respect to a plurality of websites in which the evaluator provides a similar service, when the task to enjoy the service in each site is set with respect to each test subject, the table or graph shown in FIGS. 8 and 9 is obtained for each site. Subsequently, the control unit 11 displays the statistical calculation result of the measured value in each site for each subtask in a graph (FIG. 10). Moreover, the unit preferably generates the graph display of the statistical calculation result of the measured value in each site (FIG. 11), and can switch the display to that of the graph shown in FIG. 10.

Figure 12:
Figure 13:
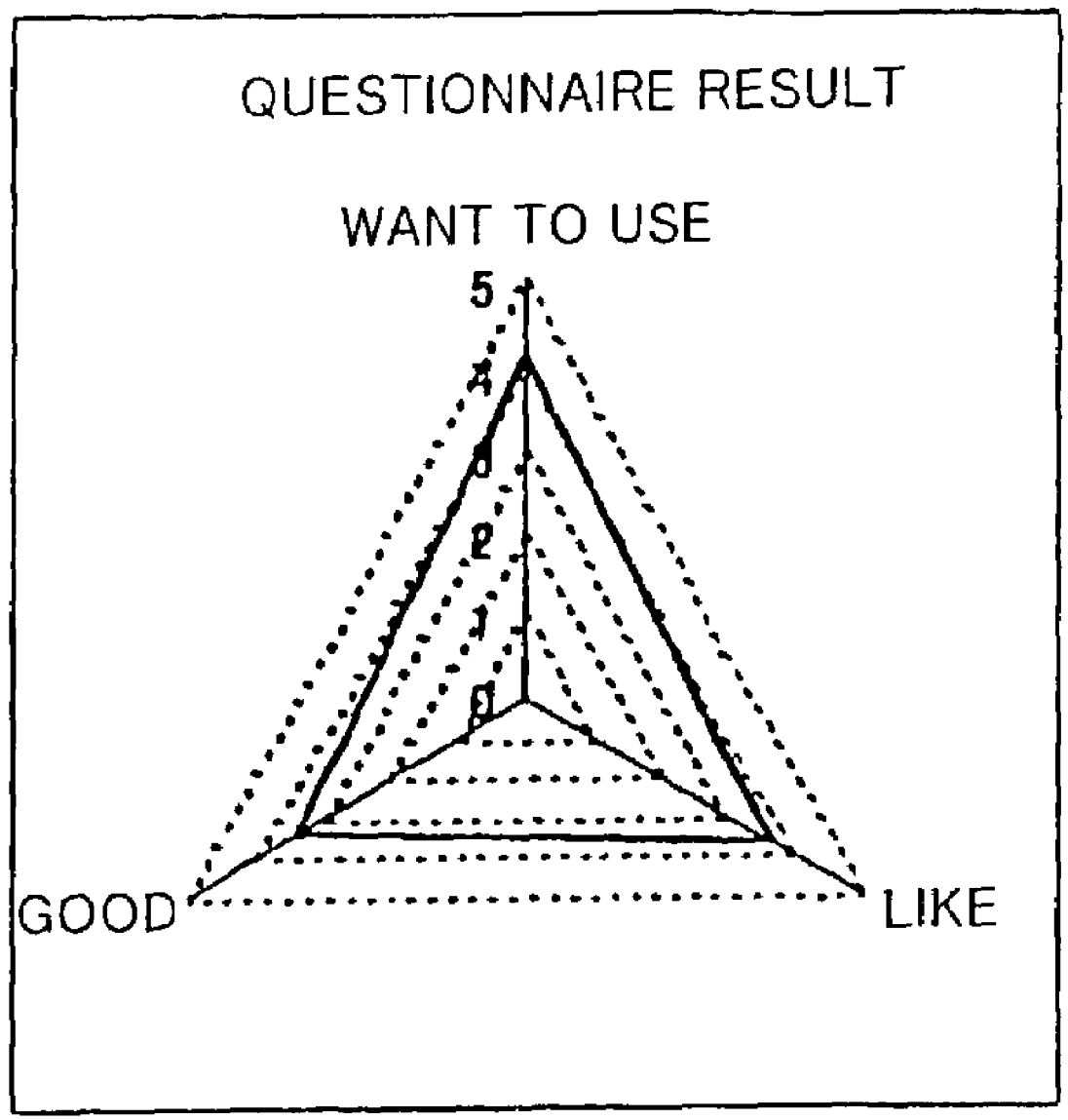

Furthermore, it is also preferable to display a graph associated with the effectiveness, efficiency, and satisfaction for each site. For example, efficiency (e.g., time required for achieving the task) is indicated on the abscissa, effectiveness (e.g., achievement of the task) is indicated on the ordinate, and each site is displayed in the graph (FIG. 12). According to the graph display, a site having high efficiency and effectiveness indicates a high usability. Moreover, the satisfaction may also be displayed using a triangular graph (FIG. 13). Thereby, it can visually be understood that a larger area triangle indicates higher satisfaction.

[Presentation of Anticipated Improvement Result]

Furthermore, the control unit 11 uses the measured value and index displayed as the value of each site in the graph, and calculates statistical values (e.g., medium value, intermediate value, or average value) among sites. It is also preferable to present an anticipated improvement result assuming that at least the average value is obtained after the improvement with respect to a site having a state worse than the statistical value (operation time is long, task achievement is low, etc.).

Figure 11:
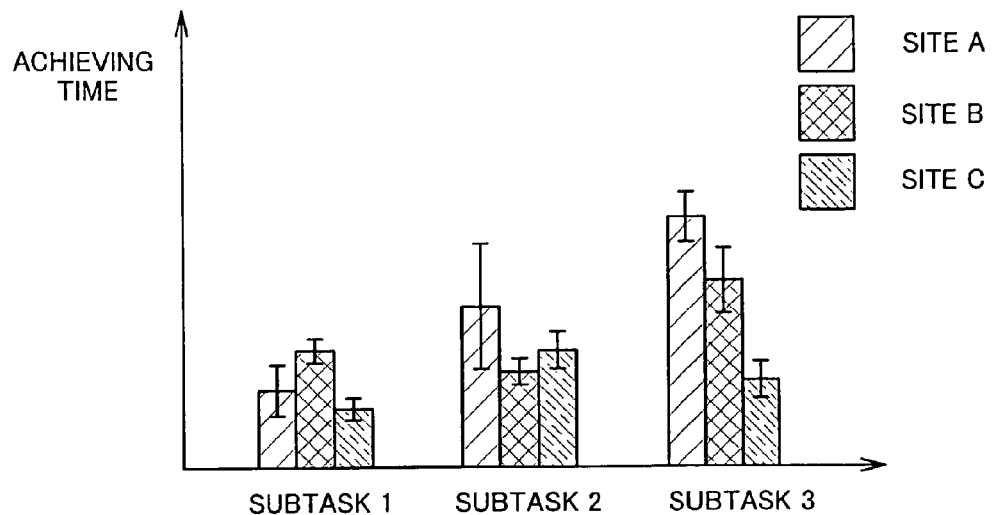

That is, as shown in FIG. 11, the graph of each subtask is displayed in each site, and it is assumed that a third subtask ("Subtask 3" in the drawing) of site A is improved. The statistical values of sites A to C of the measured value with respect to the third subtask are calculated, and the calculated statistical values are displayed. In such a case, the anticipated result improvement of the whole task may be calculated as follows. That is, with respect to each subtask, the measured value of the noted site is compared with the statistical value of the measured value among the sites. When the measured value of the noted site is worse than the statistical value, the statistical value is used. When the measured value of the noted site is better than the statistical value, the measured value is used to calculate the value of the entire task. Concretely, for the operation time, the operation time is compared with the statistical value of the operation time in each site for each subtask. For a subtask having an operation time relative to the noted site which is shorter than the statistical value, the operation time of the noted site is used. For a subtask having an operation time relative to the noted site which is longer than the statistical value, the statistical value is used, and the anticipated improvement of the complete task is obtained by the sum of the used values.

[Operation]

Therefore, the usability evaluation support apparatus 1 in the present embodiment is used and operates as follows in, for example, evaluation of the website. The biometric data detection apparatus 2 is attached to the test subject, the website which is the object of the evaluation is accessed, and the task to receive the service in the site is instructed. The test subject operates the operation unit 44 of the apparatus 4, and performs the indicated task while seeing the screen displayed in the display unit 43. During performance of the task, the control unit 41 accesses the website which is the evaluation object on the network via the network interface 45 following the instruction operation from the test subject, acquires the data of the webpage from the site, and executes processing to display the data on the display unit 43.

On the other hand, in the operation log information detection apparatus 3, the test subject's operation content is recorded as the operation log information which includes at least one operation log data. Moreover, the biometric data (including at least one living organism data) of the test subject from the biometric data detection apparatus 2, and the event information generated in response to the user operation of the apparatus 4 is input to the control unit 11. The control unit 11 stores this information together with the time counted by a clock (not shown) in the storage unit 12.

When the test subject completes (or gives up) achieving the task, the control unit 11 presents the questionnaire shown in FIG. 3 to the test subject, allows the subject to answer to the questionnaire, and acquires and stores the result which is the satisfaction data in the storage unit 12. Furthermore, the control unit 11 acquires the operation log information from the operation log information detection apparatus 3 and stores the information in the storage unit 12. It is assumed that each item of operation log data included in the operation log information is also associated with the information of time counted by the incorporated clock (not shown) in the operation log information detection apparatus 3. The time of the clock (not shown) referred to by the control unit 11 is adjusted beforehand to that of the clock referred to by the operation log information detection apparatus 3. Alternatively, a single clock may be referred to by all devices.

The operation log data included in the operation log information recorded in this manner includes the operation time, the number of clicks, the movement amount of the pointing device, the number of instances of accessing of the help function, the number of error occurrences, the input information as such, the amount of input information, and the number of references to an electronic manual. The data included in the event information includes the transfer state of the screen, information displayed on the screen, and time until the operation of the test subject receives a response.

Subsequently, the control unit 11 divides the operation content, biometric data, and event information for each predetermined subtask, and executes the following processing with respect to each subtask.

That is, the unit uses the divided operation contents, biometric data, and event information to calculate the following:

(1) the number of error occurrences during performance of the subtask;

(2) task achievement at a subtask completion (or giving up) time;

(3) ratio of the number of screen transfers at the subtask completion (or giving up) time to the number of transfers in an ideal case; and (4) the number of help accesses during the subtask performance. These are weighted/added to calculate the index of effectiveness of each subtask. Here, the subtask achievement at the subtask completion (or giving up) time is determined based on the above-described achieving conditions. That is, the predetermined numeric value is determined as the achievement by the webpage displayed at the subtask completion (or giving up) time.

The control unit 11 calculates the following:

(1) the time required to achieve the subtask (i.e., the time corresponding to the sum of the response time, time required for interpreting the displayed content, and time required for the operation);

(2) the number of clicks during performance of the subtask;

(3) the movement amount of the pointing device during performance of the subtask (screen scroll amount, or movement amount of the mouse pointer);

(4) the amount of information input during performance of the subtask (the number of keystrokes);

(5) the number of references to the electronic manual during the subtask;

(6) the number of transfers of the screen required for the subtask;

(7) the sum of response time required for the subtask;

(8) the amount of content displayed in the display unit 43 during the subtask (the amount of text, the amount of pixels constituting the page, the number of colors, the image size, and the number of images); and (9) the biometric data obtained during performance of the subtask (amount of eye movement, perspiration amount, difference of heart rates before and during the operation, the number of blinks, and the like). These are weighted or added to calculate the index of the efficiency of each subtask.

The control unit 11 calculates the following:

(1) the cognitive tendency of the attitude, behavior tendency, and emotional tendency by the analysis of the questionnaire information; and (2) difference (finite difference or ratio) between the reference value (normal time) obtained from analysis of the biometric data and the biometric data during the task achieving, for example, $\alpha$ wave amount of electroencephalogram/ evaluation by ESAM, diameter of the pupil, perspiration amount, and the like). The unit calculates the index of the satisfaction as the result of the statistical calculation with respect to these.

It should be noted that the control unit 11 may also separately acquire the index of the satisfaction of the entire task based on the cognitive tendency of the attitude, behavior attitude tendency, and emotional tendency from the analysis of questionnaire information.

Furthermore, the control unit 11 executes the processing to presume the user's state with respect to the screen displayed in the display unit 13 during the performance of each subtask, and stores the obtained state information and evaluation information for each screen. Additionally, the control unit 11 uses the predetermined statistical rule (second rule) using at least a part of each index to calculate the evaluation result corresponding to each index, and displays the calculated evaluation result in accordance with the evaluator's instruction in the display unit 13.

The respective indexes calculated in this manner, together with the test subject and achieved task, are associated with unique identifiers, and stored in the storage unit 12. Subsequently, the control unit 11 displays these indexes on the display unit 13 in response to evaluator instructions.

Thereby, it is possible to specify the subtask which negatively effects the evaluation of the whole task. Furthermore, the state of the user in the subtask, and the evaluation of the visual presentation state of the information can be represented in character strings, and it is possible to specify the concrete factor.

[Evaluation Result of Effectiveness]

In a certain example according to the present embodiment, the index of the effectiveness has two aspects. That is, the aspects include an aspect (task achievement rate) of the ratio of the user who has completed the task, and degree (task success rate) of completion of the achievement of each subtask included in the task during the achievement of the task. The task achievement rate is the index of completeness when a plurality of test subjects achieve the designated target of the task, and is defined by the ratio of the test subjects who can achieve the final target of the task (ratio of the test subjects who have achieved the final target to the number of all the test subjects). This is preferably displayed as a table or bar graph. Moreover, when the task can be divided into a plurality of subtasks, the ratio of the test subjects who have achieved the final target for each subtask may also be used. The task success rate can be calculated only when the designated task can be divided into subtasks. That is, to obtain a usability evaluation result which is more detailed than the task achievement rate, a second index of completeness in achieving the designated target of the task by the plurality of test subjects is calculated. Concretely, for the task success rate, the average of the subtask achievement is calculated in percentage. That is, the following is calculated:

$$\Sigma(\text{task achievement for each subtask})/\text{the number of subtasks} \quad [\text{Equation 3}]$$

To visually display the task success, a table or bar graph is preferably displayed. It is to be noted that for effectiveness, the achievement of each task or task success is the evaluation result itself. On the other hand, the achievement of the subtask is presented for analyzing factors. Additionally, the success of the subtask cannot theoretically be defined.

[Evaluation Result of Efficiency]

For efficiency, the task operation time, the number of clicks required to achieve the task (the number of task clicks), and eye movement amount during performance of the task (task eyes movement amount) are evaluation results. The task operation time corresponds to time resources consumed in association with the accuracy and completeness in operating the apparatus 4 to achieve the designated target of the task by the test subject. Data and graphs for test subjects who has achieved the task are preferably handled separately from those of test subjects who cannot achieve the task. Thereby, the difference in time resource use between a test subject who has achieved the task and a test subject who has not achieved the task, or difference in the use of the time resource between the subtasks can be evaluated. For visual display, maximum, minimum, standard deviation, and standard error are preferably presented in the table. Moreover, a bar graph may also be used. In such a case, the average value may be represented by the height of the bar graph, the maximum/minimum may be represented by a point, and the standard deviation may be represented by a width.

The number of task clicks is used as the index of the operation amount consumed in association with the accuracy and completeness in operating the apparatus 4 to achieve the designated target of the task by the test subject. Here also, the data and graph of test subjects who have achieved the task is preferably handled separately from that of the test subjects who cannot achieve the task. For visual display, for a test subject who has achieved the task and a test subject who has not achieved the task, the average number of test subject clicks required to complete, or not complete, the task is displayed as a table or bar graph in units of clicks. When displaying a bar graph, the task operation time of the test subject who has achieved the task and that of the test subject who has not achieved the task are preferably presented in one graph. As for the number of clicks, even when, for example, the mouse includes a plurality of buttons, the total number is counted without identifying the clicked button, but each double clicking is counted as two clicks. To divide the task into the subtasks, the test subjects are divided into those who have achieved the task (not the subtask) and those who have not achieved the task, and data on the number of clicks during the achievement of the subtask is presented in a single bar graph. Here, for example, the table shows the maximum/minimum, standard deviation, and standard error, and, in the bar graph, the average value is represented by the height of the bar graph, the maximum/minimum is represented by the point, and the standard deviation is represented by the width.

The task eye movement amount is an index of the recognized load in association with the accuracy and completeness in operating the apparatus 4 to achieve the designated target task. Also in this case, the data and graphs of test subjects who successfully completed the task are preferably handled separately from those of test subjects who did not complete the task. More specifically, with respect to the task eye movement amount, the test subjects are divided into those who have achieved the task and those who did not achieve the task, and the average total amount of eye movement for the test subjects is displayed, for example, in millimeter units, and visually displayed in table or bar graph form. For the eye movement amount, the data of angle of eye movement obtained from the biometric data is converted to a distance on the display (in the display unit 43), and calculated as the accumulated value of the movement distance between noted focal points (fine movement is ignored). In the bar graph, the eye movement amount of test subjects who achieved the task and that of test subjects who have not achieved the task are preferably displayed together in one graph. For display in a table, data for the test subjects who completed the task, data for the test subjects who did not achieve the task, and composite data for all test subjects is presented together so that the three categories of test subjects can be compared with one another. To divide the task into subtasks, the test subjects are divided into those who achieved the task (not the subtask) and those who did not achieve the task, and all eye movement data collected during performance of the subtask is presented in a single bar graph. A table may be constructed such that it shows the maximum/minimum, standard deviation, and standard error, and in a bar graph, the average value may be represented by the height of the bar graph, the maximum/minimum by points, and the standard deviation by width.

The task operation time, number of task clicks, and task eye movement amount are used as the evaluation results, and the operation time, number of clicks, and eye movement amount for each subtask are used for analyzing various factors.

[Evaluation of Satisfaction]

Evaluation of satisfaction includes subjective satisfaction evaluation, function factor subjective evaluation, and positive feeling factor subjective evaluation. The subjective satisfaction is a presented index of positive attitude toward the evaluation object after the test subject operates the apparatus 4 to achieve the designated target task, or after the test subject performs a task to freely browse the evaluation object from the homepage of the website. It is to be noted that when the task is to freely browse pages from the homepage, the whole site including the homepage is the evaluation object, not the homepage. For the designated task (object task), the test subjects are divided into those who achieved the object task and those who did not achieve the task, and any difference in their respective attitudes are evaluated. Moreover, for example, after freely browsing the pages from the homepage to perform the object task in the site, one of the objects is to evaluate the change from a difference between the indexes of the positive attitudes after the free browsing and after completion of the object task.

Moreover, in the function factor subjective evaluation, the index of the subjective satisfaction is presented concerning function factors (factors such as ease of use) with respect to the evaluation object after a test subject operates the apparatus 4 to achieve the designated target task, or after the test subject performs the task of browsing the evaluation object from the homepage of the website. It is to be noted that when the task is the browsing of pages linked to the homepage, the whole site including the homepage is the evaluation object, not just the homepage. For a designated task (object task), the test subjects are divided into those who successfully completed the object task and those who did not achieve the object task, and any differences in the subjective satisfaction concerning the function factor between the groups are evaluated. Moreover, for example, after freely browsing pages from the homepage in order to execute the object task for the site, one of the objects is to evaluate any change in the difference between the indexes of the satisfactions after the free browsing and after the executing of the object task. For visually displaying the results, a radar chart in which subjective evaluation of each function factor is indicated along each axes may be preferably employed.

Furthermore, in the positive feeling factor subjective evaluation, the index of the subjective satisfaction is presented concerning positive feeling factors (factors such as impression) with respect to the evaluation object after the test subject operates the apparatus 4 to achieve the designated target task, or after the test subject performs the task to freely browse the evaluation object from the homepage in the website. It is to be noted that for a task involving free browsing or the accessing of pages linked to the homepage, the entire site including the homepage is the evaluation object, not just the homepage itself. For a designated task (object task), the test subjects are divided into those who achieved the object task and those who did not achieve the task, and the subjective satisfaction concerning the positive feeling factor of the respective groups is evaluated and compared. Moreover, for example, after freely browsing pages from the homepage in order to perform and object task for a particular site, one of the objects may be to evaluate changes in differences between the indexes of the satisfaction after the free browsing and after the executing of the object task. For visually displaying the results, a radar chart in which subjective evaluation of each function factor is indicated along each axis may be preferably employed.

Although in the above description, the usability evaluation support apparatus 1 and apparatus 4 of the present embodiment are separate apparatuses, the usability evaluation support apparatus 1 may also serve as the apparatus which the test subject must operate to achieve the task.

What is claimed is:

1. An apparatus which uses an instrument comprising a display unit for displaying information to support evaluation of usability in a given task, the apparatus comprising:
    an acquiring part that acquires information of an operation log related to an operation performed by a user in achieving the task; and
    an index evaluation part that evaluates individually an effectiveness index, efficiency index, and satisfaction index related to achieving a target of the task,
    wherein the index evaluation part uses measurement results of a plurality of measurement items including the operation log information to evaluate the effectiveness, efficiency, and satisfaction indexes,
    divides the measurement results concerning performance of each subtask included as an element of the task, and
    uses the divided measurement results to evaluate the effectiveness, efficiency, and satisfaction indexes for each subtask.

2. The usability evaluation support apparatus according to claim 1, further comprising:
    a biometric data acquiring part that acquires biometric data of the user while the user performs the task,
    wherein the index evaluation part uses the measurement results of the plurality of measurement items including the operation log information and the biometric data to evaluate the effectiveness, efficiency, and satisfaction indexes for each subtask.

3. The usability evaluation support apparatus according to claim 1, further comprising:
    satisfaction evaluation acquiring part that acquires a satisfaction evaluation of the user concerning the task,
    wherein the index evaluation part uses the measurement results of the plurality of measurement items including the satisfaction evaluation to evaluate individually the effectiveness, efficiency, and satisfaction indexes for each subtask.

4. An apparatus which uses an instrument including a display unit for displaying information to support evaluation of usability for achieving a given task, the apparatus comprising:
    an acquiring part that acquires information of an operation log related to an operation performed by a user in achieving the task; and
    an evaluating part that uses measurement results of a plurality of measurement items including the information of the operation log to evaluate individually an effectiveness index, an efficiency index, and a satisfaction index in achieving a subtask for each subtask of the task.

5. A method for using an instrument comprising a display unit for displaying information to support evaluation of usability for a given task, the method comprising:
    a step of acquiring information of an operation log related to an operation performed by a user in achieving the task; and
    an index evaluation step of evaluating individually an effectiveness index related to accuracy and completeness in achieving a target of the task, an efficiency index related to a resource consumed in association with the accuracy and completeness in achieving the target of the task, and a satisfaction index related to user satisfaction in achieving the target of the task,
    wherein the index evaluation step comprises the steps of:
    using measurement results of a plurality of measurement items including the operation log information to evaluate the effectiveness, efficiency, and satisfaction indexes;
    dividing the measurement results concerning the achievement of a subtask for each subtask included as a constituting element in the task; and
    using the divided measurement results to evaluate the effectiveness, efficiency, and satisfaction indexes for each subtask.

6. A usability evaluation support program stored in a computer readable medium for enabling a computer to use an instrument including a display unit for displaying information and to execute processing supporting evaluation of usability in achieving a given task, the program causing the computer to execute:
    a procedure of acquiring information of an operation log related to an operation performed by a user in achieving the task;

a procedure of using measurements of a plurality of measurement items including information of an operation log to individually evaluate an effectiveness index related to accuracy and completeness in achieving a target of the task, an efficiency index related to a resource consumed in association with the accuracy and completeness in achieving the target of the task, and a satisfaction index related to user satisfaction in achieving the target of the task;

a procedure of dividing the measurement results concerning the achievement of a subtask for each subtask included as a constituting element in the task; and a procedure of using the divided measurement results to evaluate the effectiveness, efficiency, and satisfaction indexes for each subtask.

* * * * *